United States Patent

Noack et al.

[11] 4,143,504
[45] Mar. 13, 1979

[54] CORNSTALK HARVESTER

[75] Inventors: Christian Noack, Guttau; Klaus Oliva, Langburkersdorf; Theodor Eistert, Neustadt; Bernd Zümpf, Rathmannsdorf; Hans P. Spaida; Günter John, both of Neustadt; Frank Pietschmann, Bautzen, all of Fed. Rep. of Germany; Pal Boltizar, Budapest, Hungary; István Fábry, Budapest, Hungary; Csongor Vida, Budapest, Hungary; Lájos Lakos, Budapest, Hungary; Mátyás Klement, Budapest, Hungary

[73] Assignee: Veb Kombinat Fortschritt Landmaschinen Neustadt In Sachsen, Sachsen, Fed. Rep. of Germany

[21] Appl. No.: 762,236

[22] Filed: Jan. 25, 1977

[51] Int. Cl.² ............................................. A01D 45/02
[52] U.S. Cl. ........................................... 56/98; 56/111
[58] Field of Search ................ 56/98, 106, 108, 111, 56/88

[56] References Cited

U.S. PATENT DOCUMENTS

| 1,565,315 | 12/1925 | DuPlessis | 56/118 |
|---|---|---|---|
| 1,583,751 | 5/1926 | Woodland | 56/118 |
| 1,731,826 | 10/1929 | Morava | 56/44 |
| 2,560,801 | 7/1951 | Kuhlman | 56/106 |
| 2,635,409 | 4/1959 | Thomann | 56/44 |
| 2,882,669 | 4/1959 | Jones | 56/111 |
| 2,906,083 | 9/1959 | Rettig | 56/111 |
| 3,429,111 | 2/1969 | Looker | 56/108 |
| 3,866,399 | 2/1975 | Fell et al. | 56/98 |
| 3,894,382 | 7/1975 | Jauss | 56/98 |
| 3,940,913 | 3/1976 | Wallenfang et al. | 56/98 |
| 3,961,466 | 6/1976 | Martin et al. | 56/98 |

FOREIGN PATENT DOCUMENTS 526317 10/1976 U.S.S.R. ........................................ 56/98

Primary Examiner—Russell R. Kinsey
Assistant Examiner—Paul J. Hirsch
Attorney, Agent, or Firm—Karl F. Ross

[57] ABSTRACT

A harvester for a multirow corn crop comprises a cutting head whose leading edge is formed with individual cutting members at each of a plurality of channels. The channels run rearwardly and unite at the rear portion of the head. Each of the channels is provided along one flank with a yieldable wall and along the other flank with a chain having entraining members reaching substantially across the full width and height of the channel. The entraining members are preferably of L-shape in plan view and have a pair of friction strips resting against the respective wall of the channel above and below the chains.

8 Claims, 8 Drawing Figures

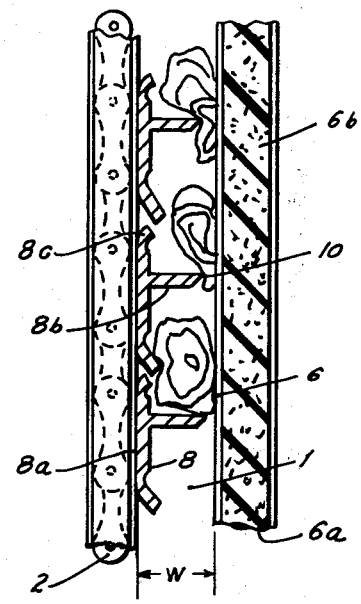
FIG. 1
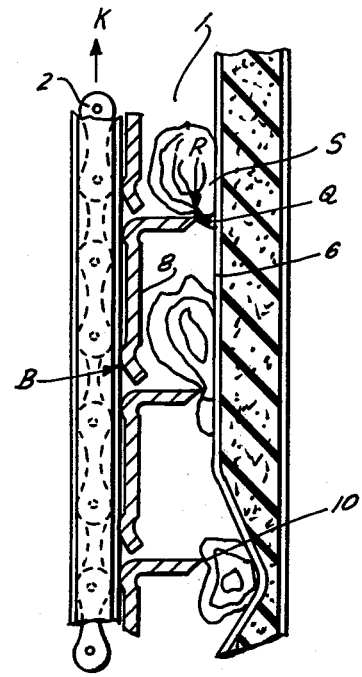
FIG. 2
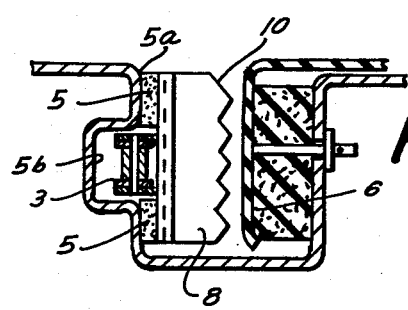
FIG. 3
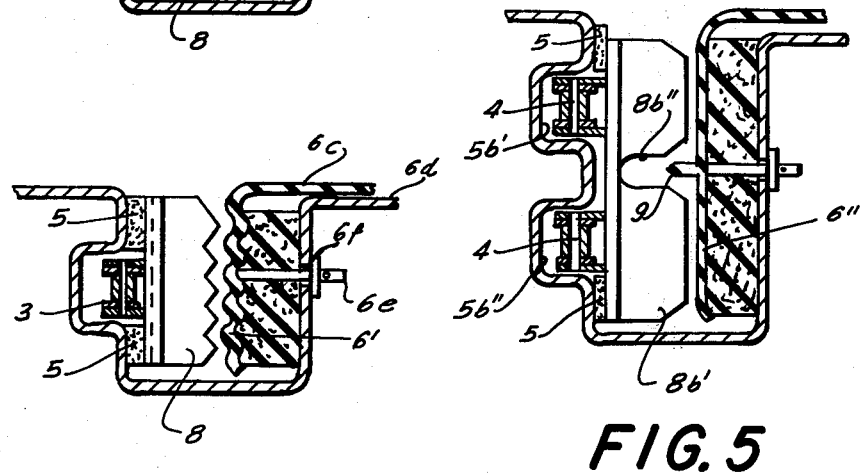
FIG. 4
FIG. 5

CORNSTALK HARVESTER

FIELD OF THE INVENTION

The present invention relates to a corn harvester, e.g. a field chopper for corn, adapted to harvest the entire corn plant in row culture and, more particularly, to a row-crop harvester for harvesting a plurality of rows of a stalk crop simultaneously.

BACKGROUND OF THE INVENTION

Corn choppers provided with multirow cornstalk-cutting heads are known wherein a channel leading to a chopper blade or a conveyor (feeding, in turn, a chopper blade) runs rearwardly from the leading edge of the machine, at which a sickle bar or other blade system cuts the stalk from the ground. On both sides of this channel, there are provided chains with entraining members which are disposed in several superposed planes and are intended to grip the cornstalks and displace them along the channel. The disadvantages of this system are that it is difficult to maintain the proper spacing of the chains, that considerable maintenance is required, and that considerable wear occurs which requires the chains to be replaced, retensioned and readjusted frequently.

Other cornstalk cutters have been provided in which a chain lies only along one side of the channel and the other side of each channel is provided with flexible pressing bars which retain the stalks against the protuberances of the conveyor chain. In such systems the frictional resistance to advance of the chain is high and there is often a nonuniform or uncontrolled stalk advance which becomes discontinuous, leading to blocking of the channel.

A further disadvantage of the conventional cornstalk cutting heads (corn heads) is that the channels widen toward the chopping unit. In some agricultural machines of this type, a transverse worm conveyor is provided between the corn head and the chopping unit and the crop material is gathered from the corn head displaced over a constricted cross-section to the chopping unit. In such devices, the orientation of the stalks reaching the cutting unit is indeterminate and an optimum or accurate chopping is not obtained.

In earlier corn heads, moreover, the material throughput is limited and, when large throughputs are attempted, the stress on the chains and sprocket wheels become nonuniform, leading to increased wear. These disadvantages have placed limits on the size of the corn heads to the extent that they have not hitherto been developed for high harvesting rates, i.e. for many crop rows.

OBJECT OF THE INVENTION

The principal object of the invention is to provide a corn head capable of harvesting a large number of rows of cornstalks with high throughput and, nevertheless, exact stalk guidance for more effective chopping of the crop.

SUMMARY OF THE INVENTION

This object and others which will become apparent hereinafter are obtained, in accordance with the invention, in a corn head having a plurality of stalk-feeding channels leading rearwardly from respective stalk cutters and in which a conveyor chains along one side of the channel is provided with entraining members projecting laterally into the channel while the other side of the channel has a stationary yieldable flank such that the entraining members extend practically across the full width of the channel and also fill substantially the full height thereof. The entraining members thus project from the chain body and reach across the channel to a minimum clearance from the opposing flank and lie at a minimum distance above the channel floor. The terms "minimum clearance" and "minimum distance", wherever used herein, are intended to mean distances and clearances of the order of millimeters and to insure proximity of the identified portions without contact.

Furthermore, the adjacent entraining members are at a minimum distance from one another and can even be in contact with one another within the channel or may overlap. To this end, the entraining members can be of T-shape or L-shape as seen in plan view with the shanks of the T or L lying along the wall of the channel and the foot extending thereacross. Each shank thus reaches substantially to the foot of the next member.

The shanks of the entraining members can be provided, along the lengths of each shank above and below the chain, with friction layers or strips which lie continuously in direct contact with the flank of the channel along which the chain is provided. These friction strips can be composed of polytetrafluoroethylene or other low-friction material to reduce the drag on the chains or can be composed of a high coefficient of sliding friction, e.g. brake shoe material, without serious detriment. In either case, the friction strips have a low degree of wear and take up any force moments generated against the feet. Thus the chain is subjected only to tensile stress and the tilting of the chain links is precluded by the minimum distance between the entraining members and the pressing flank of the channel.

To hold the stalk securely against the entraining members, as indicated earlier, the pressing flank or strip of the channel is elastically yieldable. Best results are obtained when this flank is profiled complementarily to the feet of the entraining members or is provided with a bar or ridge along its length, the feet having openings into which this bar or ridge projects.

Stalks which tend to lodge between the free end of a foot and the yieldable flank are deflected to one side and pass between the feet of adjacent entraining members for proper advance along with the following entraining member along the channel.

Because of the entraining members are each bent at right angles to the forward direction of advance of the chain and to the chains themselves, the resistance forces of the crop material which are applied to the chains are uniformly distributed. The feed channels are so disposed that they merge at their outlets in pairs into a common channel and each pair of common channels into a discharge channel. The two chains of the two channels which merge at a common channel interdigitate at the transition regions and separate again in the region of the respective sprocket wheels.

At each inlet to each channel, there is provided a respective cutting device which can include blades connected to the respective chain sprocket wheel and can be operated by the chain drive. Counter-rotating blades can be connected with the driven blades by a gear transmission and these counter-rotating blades can be provided, in addition, with rotors having arms which feed the stalks to the cutting regions. The rotors can have the form of starwheels. The floor of the channel can, at the inlet end thereof, be formed with a fixed blade with which the rotating blades cooperate to shear the stalk from the ground.

Each pair of merging channels, moreover, may be provided upon a respective support so that a plurality of such supports may be joined together to form the corn head and thereby enable the latter to be constituted as a four row or six row head.

BRIEF DESCRIPTION OF THE DRAWING

The above and other objects, features and advantages of the present invention will become more readily apparent from the following description, reference being made to the accompanying drawing in which:

FIG. 1 is a diagrammatic plan view of a channel according to one embodiment of the invention;

FIG. 2 is a diagrammatic plan view of a section of a channel according to a second embodiment of the invention;

FIG. 3 is a vertical section through a channel having a smooth resilient flank;

FIG. 4 is a cross section similar to FIG. 3 in which the entraining members and the resilient flank are complementarily profiled;

FIG. 5 is another cross section through a channel in which an entraining member is driven by a pair of chains;

SPECIFIC DESCRIPTION

Figure 6:
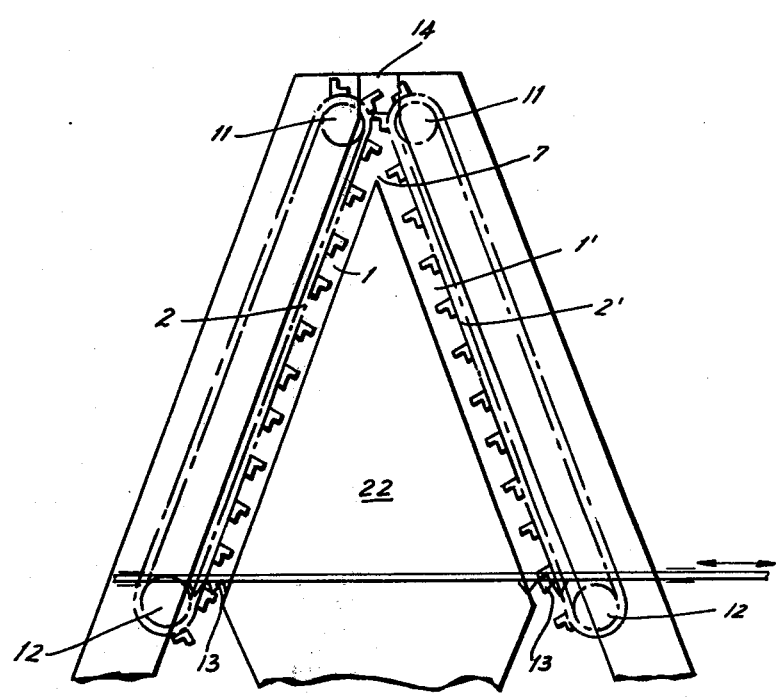
FIG. 6 is a plan view of a channel-pair unit in accordance with the principles of the present invention.

In FIG. 1 we have shown a stalk-feed channel 1 along the left hand flank of which there is provided a single chain stretch 2, the links of which carry successive entraining members 8 which are basically of L-shape as seen in plan view. The members 8 can thus have shanks 8a and feet 8b, the feet extending substantially the full width of the channel, terminating just short of the resilient flank 6 (of rubber sheet or plastic foil) formed on the other side of the channel. In addition, each entraining member may have a forwardly projecting portion 8c if desired. In any event, the feet 8b are bent at right angles to the shanks 8a which lie along the wall of the channel and, as will be described in connection with FIGS. 3 through 5, can be provided with friction strips.

The flank 6 is held away from a fixed wall 6a of the corn head by a mass of yieldable material as represented at 6b, this mass being, for example, polyurethane foam.

As can be seen in FIG. 3, the free end 10 of the entraining members 8 can be given a tooth profile and can cooperate with a smooth profile for the flank 6. Along the full length of the shanks 8a, there are provided, above and below the chain links 3, strips 5 of a low-friction material as described previously. The friction strips 5 rest directly against the side wall 5a of the channel while the chain links 3 are guided in a slot 5b thereof.

In FIG. 4 it can be seen that the flank 6' of the yieldable portion of the channel is profiled complementarily to the entraining member 8.

The yieldable flank of the channel can be formed as a resilient plate having a flange 6c overhanging the top 6d of the head and guided on pins 6e which are slidable in holes 6f in the fixed wall 6a.

As can be seen from FIGS. 6 an 7, each pair of feed channels 1, 1' comprises the respective chain 2,2', either as the single stretch represented at 3 in FIGS. 3 and 4 or as two stretches as shown at 4 in FIG. 5, the chains being flanked by the friction strips 5 which also serve to prevent crop material from penetrating into the channels 5b and 5b' or 5b" accommodating the chains.

As is also apparent from FIG. 5, the laterally projecting portions 8b or 8b' of the entraining members can be slotted at 8b" to clear a ridge or bar 9 which can be mounted upon the resiliently deflectible flank 6,6', 6".

The free ends 10 of all of the laterally extending portions of the entraining members can be sharpened or beveled to a blade-like edge as can be seen in FIGS. 1 and 2.

As a result, when the chain is displaced in the direction of arrow K (FIG. 2) the laterally projecting portions 8b, 8b', etc., entrain the stalks S normally and, if a stalk tends to wedge between the entraining members and the wall 6, there is generated a force in the direction of arrow R which causes the stalk to press against the deflectible wall 6,6', 6" as shown at the bottom of FIG. 2, against the resilient force Q, and pass the edge 10 of the entraining member. The stalk is then picked up by the next entraining member and is securely advanced between the undeflected wall 6, 6', 6" and the shank 8a of the entraining member as has been illustrated in FIGS. 1 and 2. The reaction forces applied to the entraining members are supported at B as has also been illustrated in FIG. 2.

Referring again to FIGS. 6 and 7, it will be apparent that each chain 2,2' runs around a respective sprocket wheel 11 at the discharge end of the channels 1, 1', and around idler sprockets 12 at the inlet side of the channels. Each inlet end of the channel is provided with a respective cutting device represented generally at 13 which can be a convention sickle bar or a rotary cutter arrangement that has been shown in FIG. 8.

At the junction regions of the channels, represented at 7 in FIG. 6, the entraining members interdigitate, the entraining members being shown with an exaggerated spacing in this Figure.

Figure 8:
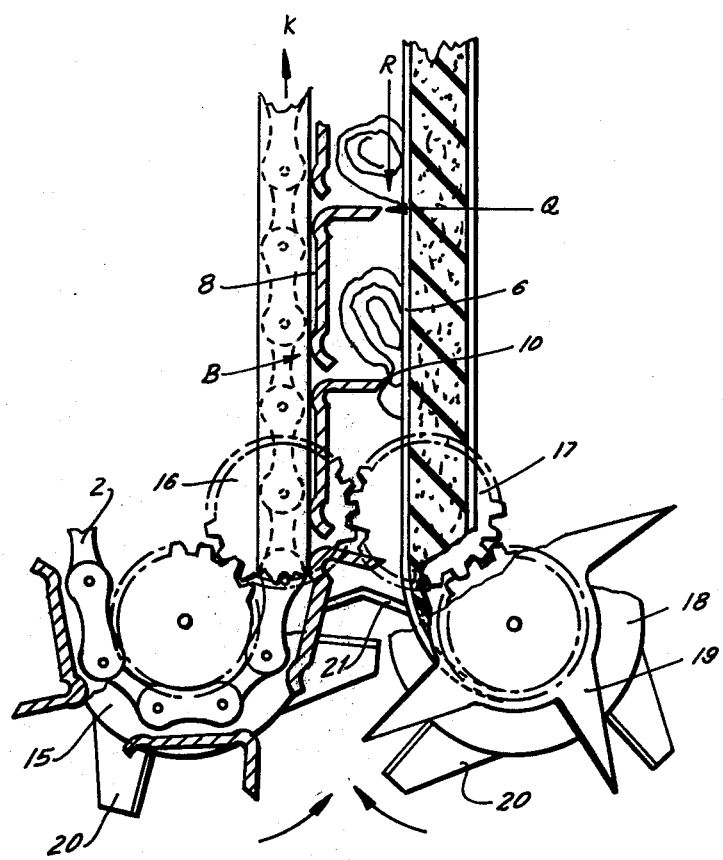
FIG. 8 is a plan view, partly broken away and partly in diagrammatic form, illustrating a detail of the stalk cutting arrangement according to the invention.

The cutting arrangement illustrated in FIG. 8 comprises a blade rotor 15 having projecting cutting blades 20 and connected to the sprocket wheel 12 which is driven by the respective chain 2 or 2'. A gear transmission consisting of meshing gears 16, 17, transfers rotary movement to a counter-rotor 18 on the opposite side of the channel, the counter-rotor 18 having blades 20 which can interdigitate with the blades 20 of rotor 15.

The rotor 18 also carries a starwheel 19 whose arms serve to feed the stalks into the channel after they have been cut by the blades 20 against a fixed blade 21 formed on the floor of the channel.

Figure 7:
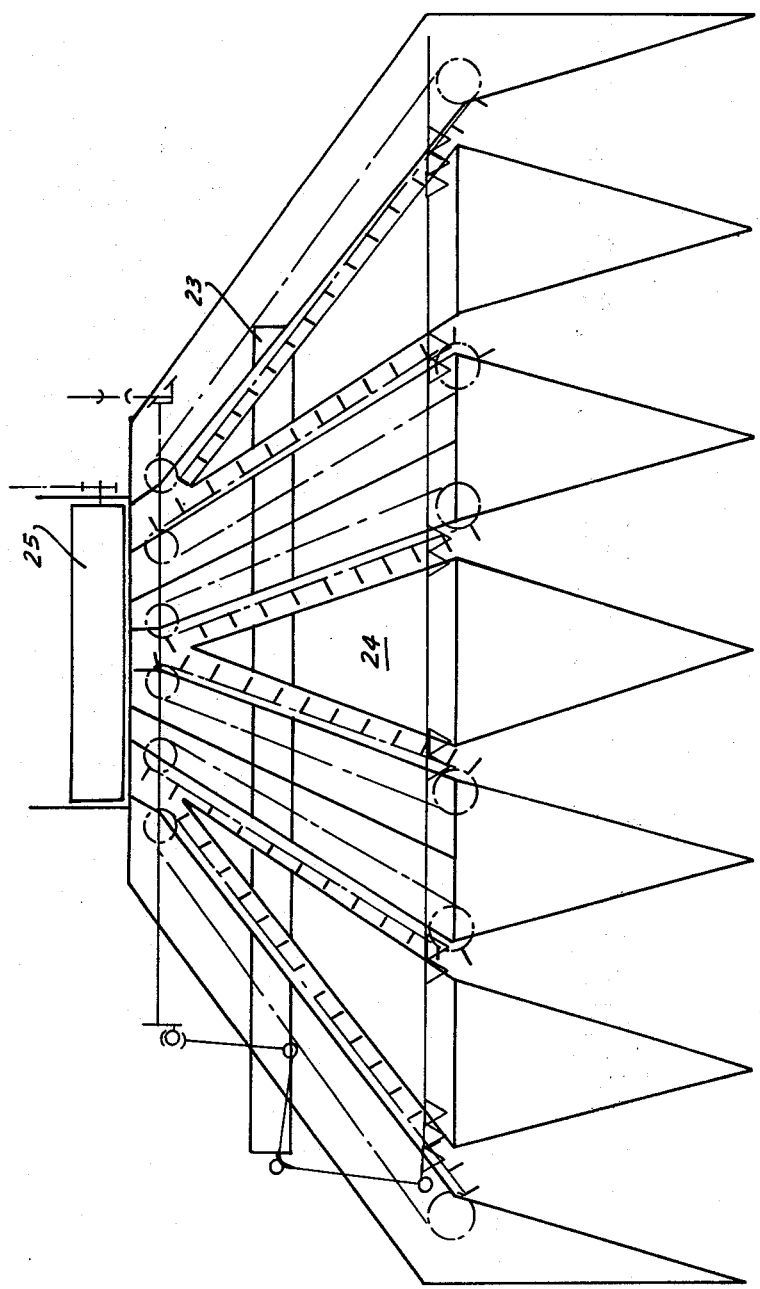
FIG. 7 is a plan view of a corn head assembled from three channel-pair units.

As is also apparent from FIGS. 6 and 7, each channel pair 22 is formed as a unit on a head structure which can be connected with other head structures on a common support 23 to form a four or six row corn cutting head 24. The corn cutting head 24 thus can have a width at its rear which corresponds to the intake window or throat of the chopping unit 25 of the machine.

We claim:

1. A corn stalk cutting head for a chopping machine comprising:

means forming at least one pair of stalk guide channels having inlet ends at a leading edge of said head and outlet ends at a rear portion of said head;

an elastically deflectable stationary flank formed along one side of each of said channels, said flank comprising a support wall, a layer of a resiliently compressible material attached to said wall and a plastic foil overlying said layer and confronting the other side of the respective channel;

a chain extending along the other side of each of said channels; and a multiplicity of entraining members mounted on said chain in closely spaced relationship, each of said entraining members being bent at right angles and formed with a shank lying along a wall of said other side of said channel and a transversely projecting foot extending substantially across the full width of said channel and substantially filling the cross section thereof, said shank being provided with friction strips resting along said wall of said other side of the channel, said feet being formed with beveled free ends proximal to said flank and forming cutting edges, said feet having profiled free extremities and said flank having a complementary profile close fitting with that of said feet.

2. The head defined in claim 1 wherein said entraining members are of L-shape in plan view.

3. The head defined in claim 1 wherein said entraining members are of substantially T-shape in plan view.

4. The head defined in claim 1 wherein said feet are toothed at said free ends.

5. The head defined in claim 1 wherein said flank is formed with a continuous ridge and said feet are provided with slots receiving said ridge.

6. The head defined in claim 1, further comprising a cutting blade at the inlet of each of said channels operatively connected with the respective chain and driven thereby, said cutting device comprising a rotor on said other side of said channel and a counter-rotor on the first-mentioned side of said channel, each of said rotors being provided with respective blades.

7. The head defined in claim 6 wherein each of said counter-rotors is provided with a respective starwheel for feeding cornstalks into the respective channel.

8. The head defined in claim 1 wherein said channels merge at the rear of said head and the chains of the respective channels interdigitate upon merger of said channels.

* * * * *